(12) United States Patent
Caronni et al.

(10) Patent No.: US 6,970,941 B1
(45) Date of Patent: Nov. 29, 2005

(54) SYSTEM AND METHOD FOR SEPARATING ADDRESSES FROM THE DELIVERY SCHEME IN A VIRTUAL PRIVATE NETWORK

(75) Inventors: Germano Caronni, Palo Alto, CA (US); Amit Gupta, Fremont, CA (US); Sandeep Kulmar, Santa Clara, CA (US); Tom R. Markson, San Mateo, CA (US); Christoph L. Schuba, Mountain View, CA (US); Glenn C. Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/458,043

(22) Filed: Dec. 10, 1999

(51) Int. Cl.[7] .................... G06F 15/173; G06F 15/16
(52) U.S. Cl. ................ 709/238; 709/227; 709/228; 709/231
(58) Field of Search ............... 709/203, 212, 709/217–219, 225, 249, 213–216, 223–224, 709/227–231, 238

(56) References Cited

U.S. PATENT DOCUMENTS

| | | |
|---|---|---|
| 4,825,354 A | 4/1989 | Agrawal et al. |
| 5,115,466 A | 5/1992 | Presttun et al. |
| 5,144,665 A | 9/1992 | Takaragi et al. |
| 5,220,604 A | 6/1993 | Gasser et al. |
| 5,241,599 A | 8/1993 | Bellovin et al. |
| 5,331,637 A | 7/1994 | Francis et al. ............ 370/408 |
| 5,335,346 A | 8/1994 | Fabbio |
| 5,519,833 A | 5/1996 | Agranat et al. |
| 5,570,366 A | 10/1996 | Baker et al. ............ 370/312 |
| 5,572,528 A | 11/1996 | Shuen ................ 370/402 |
| 5,623,601 A | 4/1997 | Vu |
| 5,636,371 A | 6/1997 | Yu |
| 5,664,191 A | 9/1997 | Davidson et al. |
| 5,696,763 A | 12/1997 | Gang, Jr. ............ 370/390 |
| 5,719,942 A | 2/1998 | Aldred et al. |
| 5,720,035 A | 2/1998 | Allegre et al. |
| 5,732,137 A | 3/1998 | Aziz ................ 713/155 |
| 5,748,736 A | 5/1998 | Mittra |
| 5,802,320 A | 9/1998 | Baehr et al. |
| 5,806,042 A | 9/1998 | Kelly et al. |
| 5,832,529 A | 11/1998 | Wollrath et al. |
| 5,835,723 A | 11/1998 | Andrews et al. ............ 709/226 |

(Continued)

FOREIGN PATENT DOCUMENTS

| | | | |
|---|---|---|---|
| EP | 0 702 477 A2 | 3/1996 | .......... H04L 29/06 |

(Continued)

OTHER PUBLICATIONS

"Virtual Private Networks on Vendor Independent Networks", *IBM Technical Disclosure Bulletin*, vol. 35, No. 4A, pp. 326-329 (1992).

(Continued)

*Primary Examiner*—Ario Etienne
*Assistant Examiner*—Hussein El-chanti
(74) *Attorney, Agent, or Firm*—Finnegan, Henderson, Farabow, Garrett & Dunner, LLP

(57) ABSTRACT

Methods and systems consistent with the present invention establish a virtual network on top of current IP network naming schemes. The virtual network uses a separate layer to create a modification to the IP packet format that is used to separate network behavior from addressing. As a result of the modification to the packet format, any type of delivery method may be assigned to any address or group of addresses. The virtual network also maintains secure communications between nodes, while providing the flexibility of assigning delivery methods independent of the delivery addresses.

7 Claims, 12 Drawing Sheets

U.S. PATENT DOCUMENTS

| | | | |
|---|---|---|---|
| 5,856,974 A | 1/1999 | Gervais et al. | 370/392 |
| 5,884,024 A | 3/1999 | Lim et al. | 713/201 |
| 5,931,947 A | 8/1999 | Burns et al. | 713/201 |
| 5,933,420 A | 8/1999 | Jaszewski et al. | 370/329 |
| 5,960,177 A | 9/1999 | Tanno | |
| 5,987,453 A | 11/1999 | Krishna et al. | |
| 5,987,506 A | 11/1999 | Carter et al. | |
| 5,996,075 A | 11/1999 | Matena | |
| 5,999,531 A | 12/1999 | Ferolito et al. | 370/390 |
| 6,026,430 A | 2/2000 | Butman et al. | |
| 6,049,878 A | 4/2000 | Caronni et al. | |
| 6,055,575 A | 4/2000 | Paulsen et al. | |
| 6,061,346 A | 5/2000 | Nordman | 370/352 |
| 6,061,796 A | 5/2000 | Chen et al. | |
| 6,078,586 A | 6/2000 | Dugan et al. | 370/395.2 |
| 6,079,020 A | 6/2000 | Liu | |
| 6,128,298 A | 10/2000 | Wootton et al. | 370/392 |
| 6,130,892 A | 10/2000 | Short et al. | 370/401 |
| 6,141,755 A | 10/2000 | Dowd et al. | 713/200 |
| 6,148,323 A | 11/2000 | Whitner et al. | 718/105 |
| 6,158,011 A | 12/2000 | Chen et al. | |
| 6,173,399 B1 | 1/2001 | Gilbrech | |
| 6,175,917 B1 | 1/2001 | Arrow et al. | |
| 6,212,558 B1 | 4/2001 | Antur et al. | 709/221 |
| 6,212,633 B1 | 4/2001 | Levy et al. | |
| 6,215,877 B1 | 4/2001 | Matsumoto | |
| 6,219,694 B1 | 4/2001 | Lazaridis et al. | 709/206 |
| 6,226,751 B1 | 5/2001 | Arrow et al. | 713/201 |
| 6,236,652 B1 | 5/2001 | Preston et al. | 370/349 |
| 6,243,814 B1 | 6/2001 | Matena | |
| 6,279,029 B1 | 8/2001 | Sampat et al. | 709/203 |
| 6,292,934 B1 | 9/2001 | Davidson et al. | |
| 6,304,973 B1 | 10/2001 | Williams | |
| 6,307,837 B1 | 10/2001 | Ichikawa et al. | 370/230 |
| 6,308,282 B1 | 10/2001 | Huang et al. | 714/4 |
| 6,327,252 B1 | 12/2001 | Silton et al. | 370/256 |
| 6,330,671 B1 | 12/2001 | Aziz | 713/163 |
| 6,333,918 B1 | 12/2001 | Hummel | 370/238 |
| 6,335,926 B1 | 1/2002 | Silton et al. | 370/351 |
| 6,370,552 B1 | 4/2002 | Bloomfield | |
| 6,374,298 B2 | 4/2002 | Tanno | |
| 6,377,811 B1 | 4/2002 | Sood et al. | |
| 6,377,997 B1 | 4/2002 | Hayden | 709/231 |
| 6,393,484 B1 | 5/2002 | Massarani | 709/227 |
| 6,415,323 B1 | 7/2002 | McCanne et al. | 709/225 |
| 6,452,925 B1 * | 9/2002 | Sistanizadeh et al. | 370/352 |
| 6,453,419 B1 | 9/2002 | Flint et al. | |
| 6,463,061 B1 | 10/2002 | Rekhter et al. | |
| 6,470,375 B1 | 10/2002 | Whitner et al. | 718/105 |
| 6,484,257 B1 | 11/2002 | Ellis | |
| 6,487,600 B1 * | 11/2002 | Lynch | 709/229 |
| 6,505,255 B1 * | 1/2003 | Akatsu et al. | 709/239 |
| 6,507,908 B1 | 1/2003 | Caronni et al. | 713/153 |
| 6,515,974 B1 | 2/2003 | Inoue et al. | 370/331 |
| 6,532,543 B1 | 3/2003 | Smith et al. | |
| 6,557,037 B1 | 4/2003 | Provino | |
| 6,560,707 B2 | 5/2003 | Curtis et al. | |
| 6,567,405 B1 * | 5/2003 | Borella et al. | 370/389 |
| 6,600,733 B2 | 7/2003 | Deng | |
| 6,606,708 B1 | 8/2003 | Devine et al. | |
| 6,615,349 B1 | 9/2003 | Hair | |
| 6,631,416 B2 | 10/2003 | Bendinelli et al. | |
| 6,693,878 B1 | 2/2004 | Daruwalla et al. | |

FOREIGN PATENT DOCUMENTS

| | | | |
|---|---|---|---|
| EP | 0813 327 A2 | 12/1997 | H04L 29/06 |
| EP | 0 887 981 A2 | 12/1998 | H04L 29/06 |
| WO | WO 89/08887 | 9/1989 | G06F 13/14 |
| WO | WO/97/48210 | 12/1997 | H04L 12/46 |
| WO | WO 98/18269 | 4/1998 | H04Q 3/00 |
| WO | WO 98/32301 | 7/1998 | H04Q 7/22 |
| WO | WO 98/57464 | 12/1998 | H04L 12/46 |
| WO | WO 99/11019 | 3/1999 | H04L 9/00 |
| WO | WO 99/38081 | 7/1999 | G06F 13/00 |

OTHER PUBLICATIONS

"V-One's SmartGate VPN", *V-One Corporation Advertisement*, pp. A5-A6.

Pakstas, A., "Towards Electronic Commerce Via Science Park Multi-Extranets", *Computer Communications*, vol. 22, pp. 1351-1363 (1999).

Wright, Michele, "Using Policies for Effective Network Management", *International Journal of Network Management*, vol. 9, pp. 118-125 (1999).

Perkins, Charles E., "Mobile IP," *IEEE Communication Magazine*, pp. 84-98 (1997).

Perkins, C., "IP Mobility Support," ftp://ftp.isi.edu/in-notes/rfc2002.txt, pp. 1-79 (1996).

Laborde, D., "Understanding and Implementing Effective VPNS," *Computer Technology Review*, Westworld Production Co., Los Angeles, vol. 18, pp. 12, 14 & 16 (1998).

Armitage, "IP Multicasting Over ATM Networks," *IEEE Journal on Selected Areas in Communications*, vol. 15, pp. 445-457 (1997).

Chua et al., "On a Linux Implementation of Mobile IP and its Effects on TCP Performance," *Computer Communications*, vol. 22, pp. 568-588 (1999).

Chung et al., "DCOM and CORBA, Side by Side, Step by Step, and Layer by Layer," *C Plus Plus Report, Sigs. Publications*, vol. 10 (1998).

De Lima et al., "An Effective Selective Repeat ARQ Strategy for High Speed Point-to-Multipoint Communications," *IEEE 47th Vehicular Technology Conference*, pp. 1059-1063 (1996).

Deng et al., "Integrating Security in CORBA Based Object Architectures," *IEEE*. pp. 50-61 (1995).

Edwards, K., "Core Jini," *Prentice Hall PTR*, (1999).

Freier et. A., "The SSL Protocol Version 3.0", Internet Draft, *Netscape Communications*, Nov. 18, 1996, pp. Abstract, 1-72.

Gleeson, Heinanen, Armitage, "A Framework for IP Based Virtual Private Networks" Online, retrieved from the Internet: <URL:http://www.alternic.org/drafts/drafts-g-h/draft-gleeson-vpn-framework-00.txt>, retrieved Jun. 27, 2001.

Perkins, C.E., "Mobile Networking Through Mobile IP", IEEE Internet Computing, IEEE Service Center, Piscataway, New Jersey, vol. 2, No. 1, 1998, pp 1-12.

Ricciuti, M., "Iona Makes CORBA Net Friendly," *CNET News.Com*, pp. 1-2 (1997).

Stevenson et al., "Design of a Key Agile Cryptographic System for OC-12c Rate ATM," *IEEE* (1995).

Teraoka, "VIP: A Protocol Providing Host Migration Transparency," *Internetworking: Research and Experience*, vol. 4, pp. 195-221 (1993).

Teraoka, "Host Migration Transparency in IP Networks: The VIP Approach," *Computer Communications Review*, pp. 44-65.

Teraoka, "A Network Architecture Providing Host Migration Transparency," *Computer Communication Review*, No. 4, pp. 209-220 (1991).

Zhao et al., "Flexible Network Support for Mobility," *A CM*, pp. 145-155 (1998).

DCOM Technical Overview, Microsoft Corporation (1996).

Introduction to OrbixOTM, IONA Technologies PLC (1999).

Orbix C++ Administrator's Guide, IOWA Technologies PLC (1999).

OrbixNames Programmer's Administrator's Guide, IONA Technologies PLC (1999).

Forman, George H., et al., "The Challenges of Mobile Computing," *University of Washington Computer Science & Engineering*, pp. 1-16 (1994).

Pike, Rob et al., "Plan 9 from Bell Labs", 1995, Lucent Technologies, pp. 1-25.

Waldvogel, Marcel et al., "The VersaKey Framework: Versatile Group Key Management", Sep., 1999, Computer Engineering and Networks Laboratory (TIK), Eth Zürich, Switzerland and Sun Microsystems Inc., Network Security Group, Palo Alto, California, pp. 1-27.

SSH IPSEC Express, White Paper, Version 2.0, Mar., 1999, SSH Communications Security Ltd., pp. 1-23.

Aziz, Ashar et al., "Simple Key-Management for Internet Protocols (SKIP)", http://www.tik.ee.ethz.ch/~skip/SKIP.html, Sep., 1999, pp. 1-19.

Aziz, Ashar et al., "Design and Implementation of SKIP", INET '95 Conference, Jun. 28, 1995, pp. 1-12.

Kent, S. et al., "IP Authentication Header", ftp://ftp.isi.edu/in-notes/rfc2402.txt, Nov., 1998, pp. 1-19.

\* cited by examiner

SYSTEM AND METHOD FOR SEPARATING ADDRESSES FROM THE DELIVERY SCHEME IN A VIRTUAL PRIVATE NETWORK

RELATED APPLICATIONS

U.S. patent application Ser. No. 09/457,917, entitled "TRULY ANONYMOUS COMMUNICATIONS USING SUPERNETS WITH THE PROVISION OF TOPOLOGY HIDING," filed Dec. 10, 1999.

U.S. patent application Ser. No. 09/457,889, entitled "METHOD AND SYSTEM FOR FACILITATING RELOCATION OF DEVICES ON A NETWORK," filed Dec. 10, 1999.

U.S. patent application Ser. No. 09/457,916, entitled "SANDBOXING APPLICATIONS IN A PRIVATE NETWORK USING A PUBLIC-NETWORK INFRASTRUCTURE," filed Dec. 10, 1999.

U.S. patent application Ser. No. 09/457,894, entitled "SECURE ADDRESS RESOLUTION FOR A PRIVATE NETWORK USING A PUBLIC NETWORK INFRASTRUCTURE," filed Dec. 10, 1999.

U.S. patent application Ser. No. 09/458,020, entitled "DECOUPLING ACCESS CONTROL FROM KEY MANAGEMENT IN A NETWORK," filed Dec. 10, 1999.

U.S. patent application Ser. No. 09/457,895, entitled "CHANNEL-SPECIFIC FILE SYSTEM VIEWS IN A PRIVATE NETWORK USING A PUBLIC NETWORK INFRASTRUCTURE," filed Dec. 10, 1999.

U.S. patent application Ser. No. 09/458,040, entitled "PRIVATE NETWORK USING A PUBLIC-NETWORK INFRASTRUCTURE," filed Dec. 10, 1999.

U.S. patent application Ser. No. 09/457,914, entitled "SYSTEM AND METHOD FOR ENABLING SCALABLE SECURITY IN A VIRTUAL PRIVATE NETWORK," filed Dec. 10, 1999.

U.S. patent application Ser. No. 09/457,915, entitled "USING MULTICASTING TO PROVIDE ETHERNET-LIKE COMMUNICATION BEHAVIOR TO SELECTED PEERS ON A NETWORK," filed Dec. 10, 1999.

U.S. patent application Ser. No. 09/457,896, entitled "ANYCASTING IN A PRIVATE NETWORK USING A PUBLIC NETWORK INFRASTRUCTURE," filed Dec. 10, 1999.

U.S. patent application Ser. No. 09/458,021, entitled "SCALABLE SECURITY ASSOCIATIONS FOR GROUPS FOR USE IN A PRIVATE NETWORK USING A PUBLIC-NETWORK INFRASTRUCTURE," filed Dec. 10, 1999.

U.S. patent application Ser. No. 09/458,044, entitled "ENABLING SIMULTANEOUS PROVISION OF INFRASTRUCTURE SERVICES," filed Dec. 10, 1999.

FIELD OF THE INVENTION

The present invention relates generally to data processing systems and, more particularly, to a private network using a public-network infrastructure.

BACKGROUND OF THE INVENTION

As part of their day-to-day business, many organizations require an enterprise network, a private network with lease lines, dedicated channels, and network connectivity devices, such as routers, switches, and bridges. These components, collectively known as the network's "infrastructure," are very expensive and require a staff of information technology personnel to maintain them. This maintenance requirement is burdensome on many organizations whose main business is not related to the data processing industry (e.g., a clothing manufacturer) because they are not well suited to handle such data processing needs.

Another drawback to enterprise networks is that they are geographically restrictive. The term "geographically restrictive" refers to the requirement that if a user is not physically located such that they can plug their device directly into the enterprise network, the user cannot typically utilize it. To alleviate the problem of geographic restrictiveness, virtual private networks have been developed.

In a virtual private network (VPN), a remote device or network connected to the Internet may connect to the enterprise network through a firewall. This allows the remote device to access resources on the enterprise network even though it may not be located near any component of the enterprise network. For example, FIG. 1 depicts a VPN 100, where enterprise network 102 is connected to the Internet 104 via firewall 106. By using VPN 100, a remote device $D_1$ 108 may communicate with enterprise network 102 via Internet 104 and firewall 106. Thus, $D_1$ 108 may be plugged into an Internet portal virtually anywhere within the world and make use of the resources on enterprise network 102.

To perform this functionality, $D_1$ 108 utilizes a technique known as tunneling to ensure that the communication between itself and enterprise network 102 is secure in that it cannot be viewed by an interloper. "Tunneling" refers to encapsulating one packet inside another when packets are transferred between two end points (e.g., $D_1$ 108 and VPN software 109 running on firewall 106). The packets may be encrypted at their origin and decrypted at their destination. For example, FIG. 2A depicts a packet 200 with a source Internet protocol (IP) address 202, a destination IP address 204, and data 206. It should be appreciated that packet 200 contains other information not depicted, such as the source and destination port. As shown in FIG. 2B, the tunneling technique forms a new packet 208 out of packet 200 by encrypting it and adding both a new source IP address 210 and a new destination IP address 212. In this manner, the contents of the original packet (i.e., 202, 204, and 206) are not visible to any entity other than the destination. Referring back to FIG. 1, by using tunneling, remote device $D_1$ 108 may communicate and utilize the resources of the enterprise network 102 in a secure manner.

Although VPNs alleviate the problem of geographic restrictiveness, they impose significant processing overhead when two remote devices communicate. For example, if remote device $D_1$ 108 wants to communicate with remote device $D_2$ 110, $D_1$ sends a packet using tunneling to VPN software 109, where the packet is decrypted and then transferred to the enterprise network 102. Then, the enterprise network 102 sends the packet to VPN software 109, where it is encrypted again and transferred to $D_2$. Given this processing overhead, it is burdensome for two remote devices to communicate in a VPN environment.

Each address used by the VPN contains implicit information as to the delivery scheme (e.g., broadcast, mutlicast, or unicast) to use. For example, the well-known "224.x.x.x" IP range relates to multicast addresses. Some addresses are even bound to a designated interface. For example, the "127.x.x.x" IP range is bound to a loopback interface on the Internet. Forcing an address to be associated with a delivery method unnecessarily restricts addressing schema. In the example mentioned above, a destination address in the "127.x.x.x" range always refers to the loopback interface and can never be changed. Because of this limitation, it is extremely hard to experiment with new or different addressing schemes on a large scale. For example, IPv6, a new addressing scheme has yet to be fully deployed on the Internet because of the different addressing scheme. IPv6 is described in greater detail in "ftp://ftp.isi.edu/in-notes/rfc2373.txt".

Therefore, it is desirable to provide addressing functionality that easily integrates and supports existing infrastructure services while at the same time allows for multiple delivery schemes.

SUMMARY OF THE INVENTION

Methods and systems consistent with the present invention overcome the shortcomings of existing delivery schemes and addressing by establishing a virtual network on top of current IP network delivery schemes. The virtual network uses a separate layer to create a modification to the IP packet format that is used to separate network behavior from addressing. As a result of the modification to the packet format, any type of delivery scheme may be assigned to any address or group of addresses. The virtual network also maintains secure communications between nodes, while providing the flexibility of assigning delivery methods independent of the delivery addresses.

In accordance with the purpose of the invention as embodied and broadly described herein, a computer is connected to a public network infrastructure over which a private network operates. The private network has a plurality of nodes, and the computer comprises a memory and a processor. The memory contains one of the plurality of nodes for communicating over the private network. The memory also contains a security layer that receives from the one node communications containing internal addresses that are suitable for use in communicating within the private network, and that translates the internal addresses into external addresses that are suitable for use in communicating over the public-network infrastructure. The internal address does not identify a delivery scheme used by the computer. The security layer also encrypts the communications, and that transmits the communications over the public network to destinations of the communications. The processor runs the one node and the security layer.

In another implementation, a method in a public network having a network infrastructure that is used by a private network over which a plurality of clients communicate with a plurality of web server. The private network uses a plurality of delivery schemes to communicate between the clients and web servers in the private network, and each of the web servers have a corresponding external address. The method requests an internal address from an address server. The internal address corresponds to a set of web servers and is not associated with a delivery scheme. Based on the selected delivery scheme, the method places the client in a context such that the client is capable of communicating with the set of web servers on the private network. Once placed, the method sends the packet from the client to the set of web servers by accessing the address mapping and adding the external address to the packet and by causing delivery of the packet to the web server to occur in a secure manner.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Methods and systems consistent with the present invention overcome the shortcomings of existing networks by establishing a "Supernet," which is a private network that uses components from a public-network infrastructure. A Supernet allows an organization to utilize a public-network infrastructure for its enterprise network so that the organization no longer has to maintain a private network infrastructure; instead, the organization may have the infrastructure maintained for them by one or more service providers or other organizations that specialize in such connectivity matters. As such, the burden of maintaining an enterprise network is greatly reduced. Moreover, a Supernet is not geographically restrictive, so a user may plug their device into the Internet from virtually any portal in the world and still be able to use the resources of their private network in a secure and robust manner.

Supernets also provide heterogeneous addressing functionality. The Supernet uses a separate layer that isolates address names of nodes from addressing schemes and delivery schemes. The Supernet contains a modification to the IP packet format that can be used to separate network behavior from addressing. As a result of the modification, any delivery scheme may be assigned to any address, or group of addresses.

Overview

Figure 1:
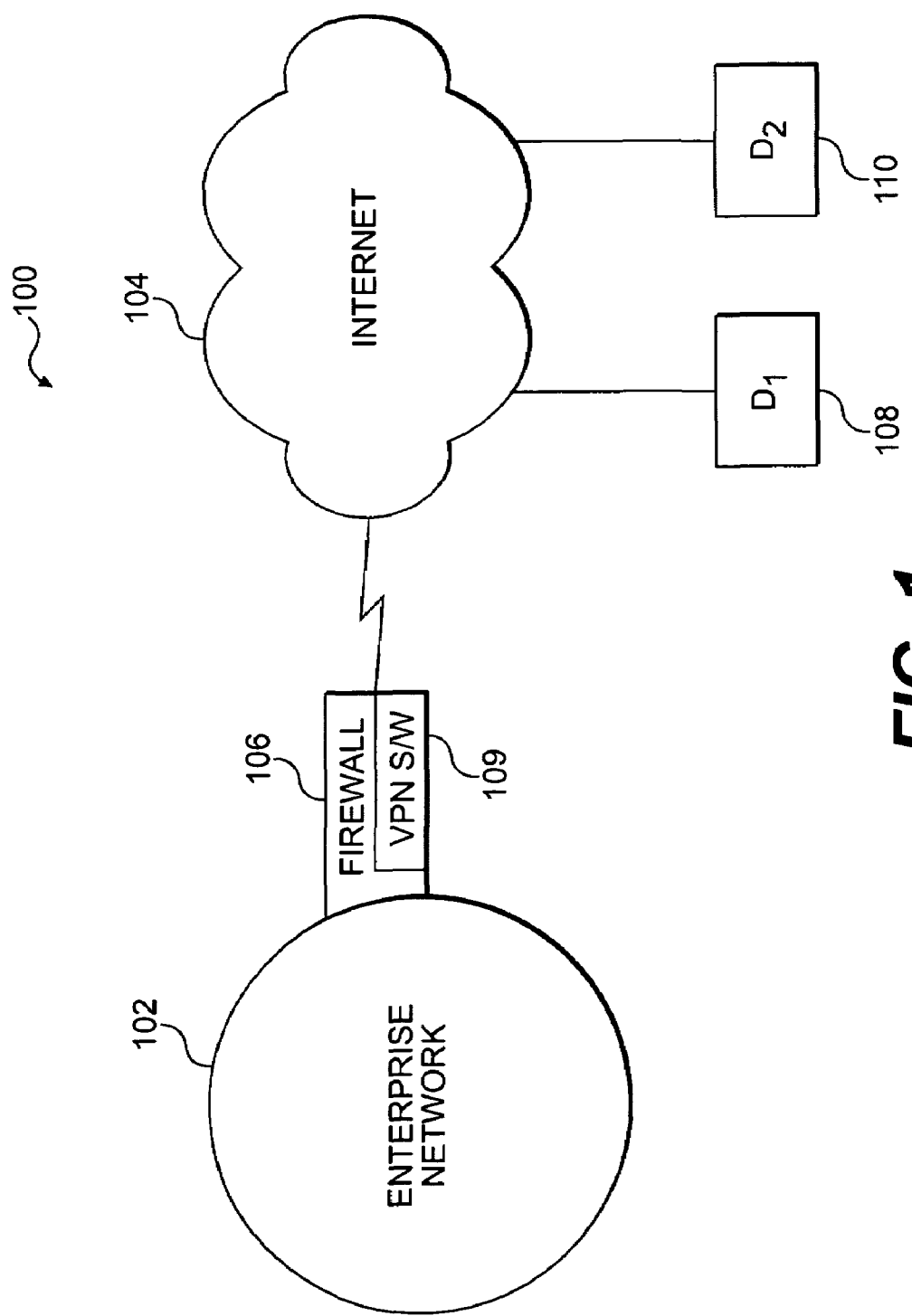
FIG. 1 depicts a conventional virtual private network (VPN) system.
Figure 2A:
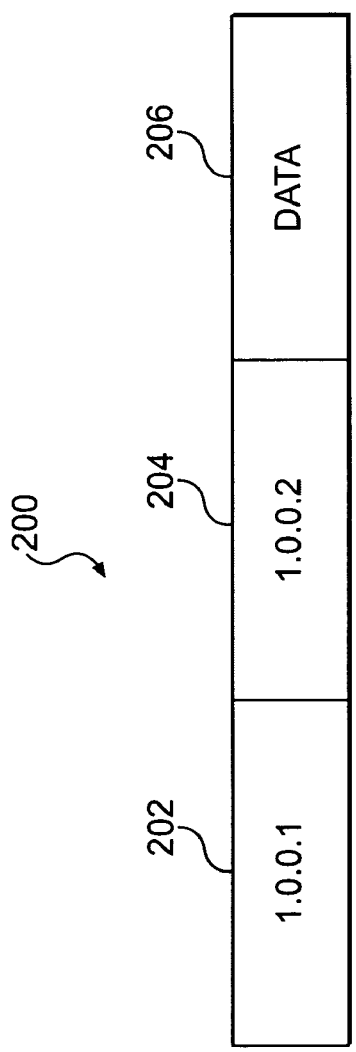
FIG. 2A depicts a conventional network packet.
Figure 2B:
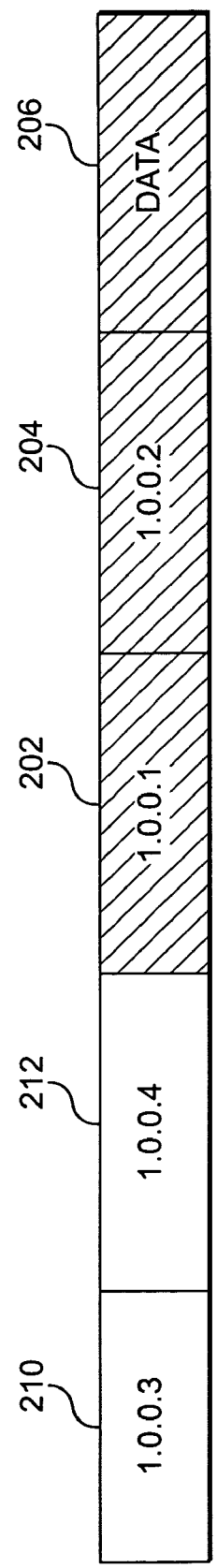
FIG. 2B depicts the packet of FIG. 2A after it has been encrypted in accordance with a conventional tunneling technique.
Figure 3:
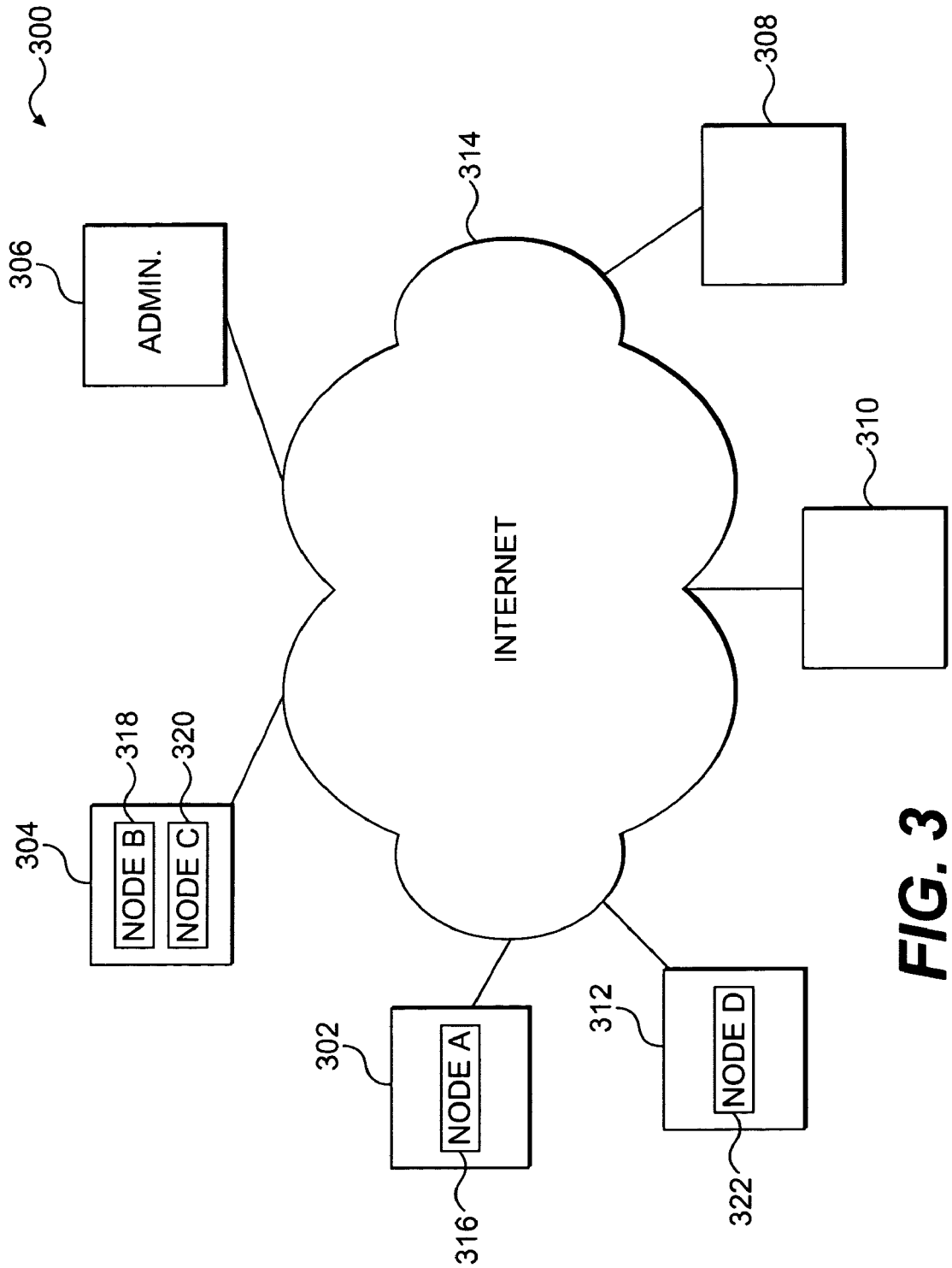
FIG. 3 depicts a data processing system suitable for use with methods and systems consistent with the present invention.

FIG. 3 depicts a data processing system 300 suitable for use with methods and systems consistent with the present invention. Data processing system 300 comprises a number of devices, such as computers 302–312, connected to a public network, such as the Internet 314. A Supernet's infrastructure uses components from the Internet because devices 302, 304, and 312 contain nodes that together form a Supernet and that communicate by using the infrastructure of the Internet. These nodes 316, 318, 320, and 322 are communicative entities (e.g., processes) running within a particular device and are able to communicate among themselves as well as access the resources of the Supernet in a secure manner. When communicating among themselves, the nodes 316, 318, 320, and 322 serve as end points for the communications, and no other processes or devices that are not part of the Supernet are able to communicate with the Supernet's nodes or utilize the Supernet's resources. The Supernet also includes an administrative node 306 to administer to the needs of the Supernet.

It should be noted that since the nodes of the Supernet rely on the Internet for connectivity, if the device on which a node is running relocates to another geographic location, the device can be plugged into an Internet portal and the node running on that device can quickly resume the use of the resources of the Supernet. It should also be noted that since a Supernet is layered on top of an existing network, it operates independently of the transport layer. Thus, the nodes of a Supernet may communicate over different transports, such as IP, IPX, X.25, or ATM, as well as different physical layers, such as RF communication, cellular communication, satellite links, or land-based links.

Figure 4:
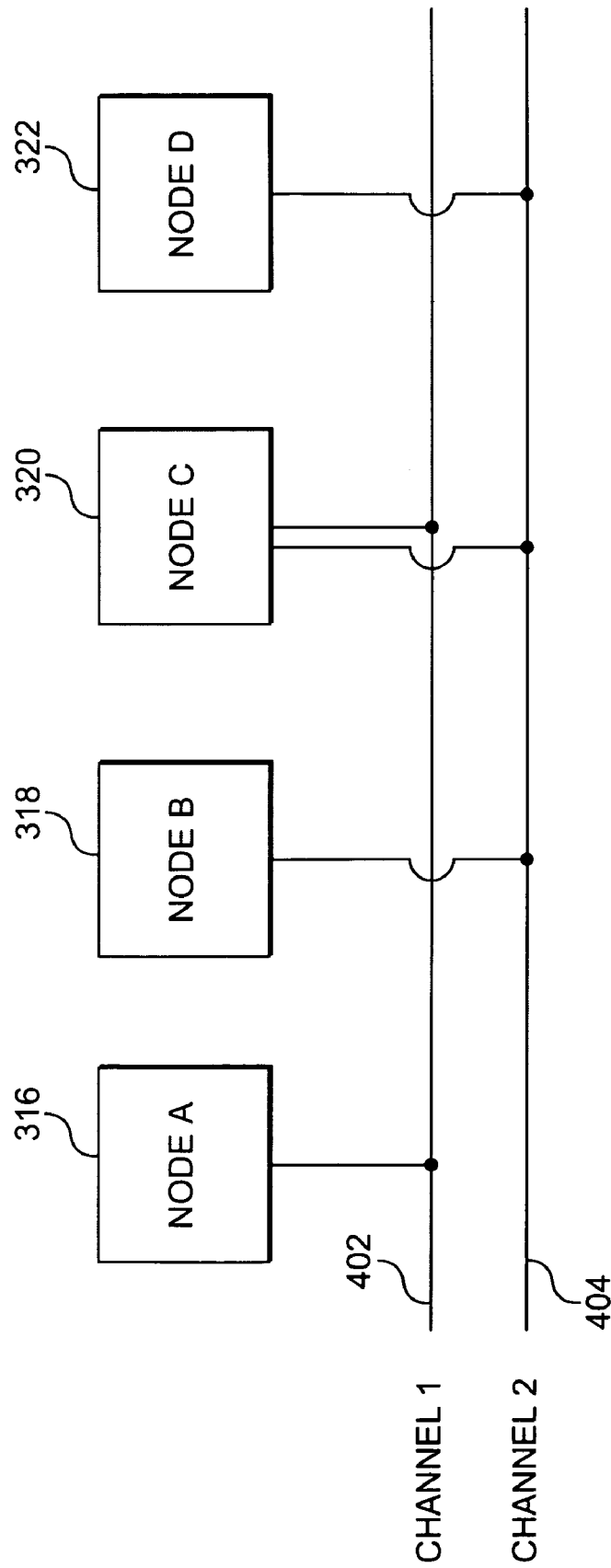
FIG. 4 depicts the nodes depicted in FIG. 3 communicating over multiple channels.

As shown in FIG. 4, a Supernet includes a number of channels that its nodes 316–322 can communicate over. A "channel" refers to a collection of virtual links through the public-network infrastructure that connect the nodes on the channel such that only these nodes can communicate over it. A node on a channel may send a message to another node on that channel, known as a unicast message, or it can send a message to all other nodes on that channel, known as a multicast message. For example, channel 1 402 connects node A 316 and node C 320, and channel 2 404 connects node B 318, node C 320, and node D 322. Each Supernet has any number of preconfigured channels over which the nodes on that channel can communicate. In an alternative embodiment, the channels are dynamically defined.

In addition to communication, the channels may be used to share resources. For example, channel 1 402 may be configured to share a file system as part of node C 320 such that node A 316 can utilize the file system of node C in a secure manner. In this case, node C 320 serves as a file system manager by receiving file system requests (e.g., open, close, read, write, etc.) and by satisfying the requests by manipulating a portion of the secondary storage on its local machine. To maintain security, node C 320 stores the data in an encrypted form so that it is unreadable by others. Such security is important because the secondary storage may not be under the control of the owners of the Supernet, but may instead be leased from a service provider. Additionally, channel 2 404 may be configured to share the computing resources of node D 322 such that nodes B 318 and C 320 send code to node D for execution. By using channels in this manner, resources on a public network can be shared in a secure manner.

A Supernet provides a number of features to ensure secure and robust communication among its nodes. First, the system provides authentication and admission control so that nodes become members of the Supernet under strict control to prevent unauthorized access. Second, the Supernet provides communication security services so that the sender of a message is authenticated and communication between end points occurs in a secure manner by using encryption. Third, the system provides key management to reduce the possibility of an intruder obtaining an encryption key and penetrating a secure communication session. The system does so by providing one key per channel and by changing the key for a channel whenever a node joins or leaves the channel. Alternatively, the system may use a different security policy.

Fourth, the system provides address translation in a transparent manner. Since the Supernet is a private network constructed from the infrastructure of another network, the Supernet has its own internal addressing scheme, separate from the addressing scheme of the underlying public network. Thus, when a packet from a Supernet node is sent to another Supernet node, it travels through the public network. To do so, the Supernet performs address translation from the internal addressing scheme to the public addressing scheme and vice versa. By separating the addressing schemes, the Supernet creates a flexible delivery scheme that is easily changeable by network software or a system administrator. To reduce the complexity of Supernet nodes, system-level components of the Supernet perform this translation on behalf of the individual nodes so that it is transparent to the nodes. Another benefit of the Supernet's addressing is that it uses an IP-based internal addressing scheme so that preexisting programs require little modification to run within a Supernet.

Lastly, the Supernet provides operating system-level enforcement of node compartmentalization in that an operating system-level component treats a Supernet node running on a device differently than it treats other processes on that device. This component (i.e., a security layer in a protocol stack) recognizes that a Supernet node is part of a Supernet, and therefore, it enforces that all communications to and from this node travel through the security infrastructure of the Supernet such that this node can communicate with other members of the Supernet and that non-members of the Supernet cannot access this node. Additionally, this operating system-level enforcement of node compartmentalization allows more than one Supernet node to run on the same machine, regardless of whether the nodes are from the same Supernet, and allows nodes of other networks to run on the same machine as a Supernet node.

Implementation Details

Figure 5:
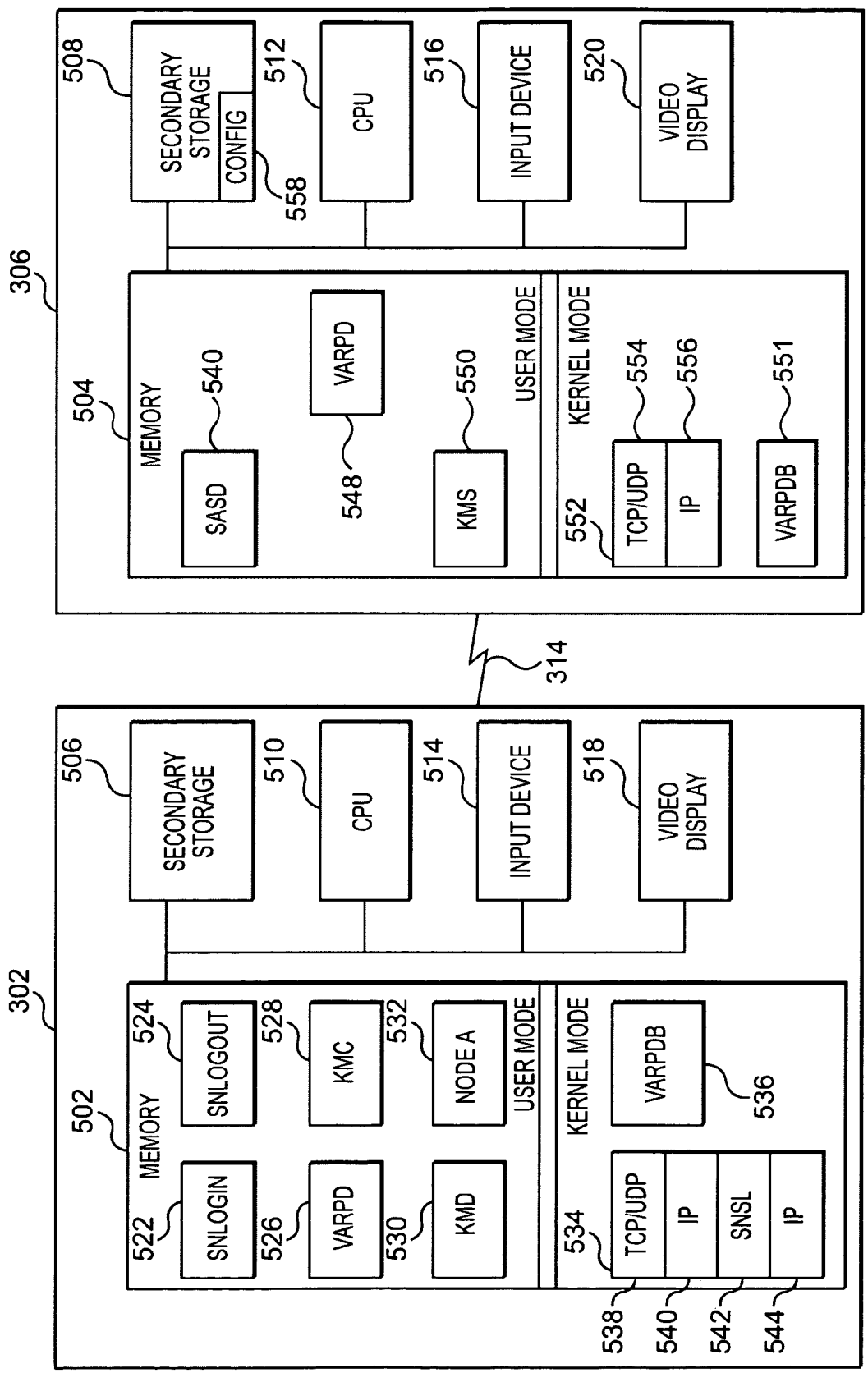
FIG. 5 depicts two devices depicted in FIG. 3 in greater detail.

FIG. 5 depicts administrative machine 306 and device 302 in greater detail, although the other devices 304 and 308–312 may contain similar components. Device 302 and administrative machine 306 communicate via Internet 314. Each device contains similar components, including a memory 502, 504; secondary storage 506, 508; a central processing unit (CPU) 510, 512; an input device 514, 516; and a video display 518, 520. One skilled in the art will appreciate that these devices may contain additional or different components. Memory 504 of administrative machine 306 includes the SASD process 540, VARPD 548, and KMS 550 all running in user mode. That is, CPU 512 is capable of running in at least two modes: user mode and kernel mode. When CPU 512 executes programs running in user mode, it prevents them from directly manipulating the hardware components, such as video display 518. On the other hand, when CPU 512 executes programs running in kernel mode, it allows them to manipulate the hardware components. Memory 504 also contains a VARPDB 551 and a TCP/IP protocol stack 552 that are executed by CPU 512 running in kernel mode. TCP/IP protocol stack 552 contains a TCP/UDP layer 554 and an IP layer 556, both of which are standard layers well known to those of ordinary skill in the art. Secondary storage 508 contains a configuration file 558 that stores various configuration-related information (described below) for use by SASD 540.

SASD 540 represents a Supernet: there is one instance of an SASD per Supernet, and it both authenticates nodes and authorizes nodes to join the Supernet. VARPD 548 has an associated component, VARPDB 551, into which it stores mappings of the internal Supernet addresses, known as a node IDs, to the network addresses recognized by the public-network infrastructure, known as the real addresses. The "node ID" may include the following: a Supernet ID (e.g., 0x123), reflecting a unique identifier of the Supernet, and a virtual address, comprising an IP address (e.g., 10.0.0.1). Although the virtual address is described in an IP address scheme, one skilled in the art will appreciate that the virtual address may be any other type addressing scheme, such as an e-mail address, IPX, or IPv6. Since the node ID includes a Supernet ID, a node will have more than one node ID when it communicates over more than one channel. The "real address" is an IP address (e.g., 10.0.0.2) that is globally unique and meaningful to the public-network infrastructure. In a Supernet, one VARPD runs on each machine, and it may play two roles. First, a VARPD may act as a server by storing all address mappings for a particular Supernet into its associated VARPDB. Second, regardless of its role as a server or not, each VARPD assists in address translation for the nodes on its machine. In this role, the VARPD stores into its associated VARPDB the address mappings for its nodes, and if it needs a mapping that it does not have, it will contact the VARPD that acts as the server for the given Supernet to obtain it. The VARPDB may also decide which virtual address to use in the translation. That is, the VARPDB may associate a virtual address with multiple real addresses or vice versa.

Because the VARPD maintains the mappings from real addresses to virtual addresses, it may also assign different delivery methods to various addresses. For example, the VARPD may assign a unicast address (e.g., 1.2.3.4) to a multicast address (e.g., 244.2.2.5) or an anycast address. In "anycast" addressing, a source node does not send a message to an individual node; instead, it sends a message to any one of a group of nodes by indicating an anycast address as a destination address, and the system selects which of the nodes will respond to the message. Such functionality allows for the best node to be selected to respond to the message based upon various selection criteria, such as which one of the nodes has the greatest capacity for responding to the message or which one of the nodes is physically closer to the source node. For example, a source node may send a message to a print service anycast address, and the Supernet will select the IP address of one of the print servers.

In the above example, if a node sends a packet to "1.2.3.4", the VARPD may associate this address with a multicast address and broadcasts the message to a predetermined list of nodes. The VARPD can also assign an IP address using various protocols. That is, other addresses (not IP) may be used for delivery within the Supernet. For example, an e-mail address may be used to deliver data in a Supernet. The sender node specifies an e-mail address as the delivery address. When the VARPD is queried for the address translation (described below), the VARPD provides the real IP address associated with the e-mail address for delivery.

KMS 550 performs key management by generating a new key every time a node joins a channel and by generating a new key every time a node leaves a channel. There is one KMS per channel in a Supernet.

To configure a Supernet, a system administrator creates a configuration file 558 that is used by SASD 540 when starting or reconfiguring a Supernet. This file may specify: (1) the Supernet name, (2) all of the channels in the Supernet, (3) the nodes that communicate over each channel, (4) the address of the KMS for each channel, (5) the address of the VARPD that acts as the server for the Supernet, (6) the user IDs of the users who are authorized to create Supernet nodes, (7) the authentication mechanism to use for each user of each channel, and (8) the encryption algorithm to use for each channel. Although the configuration information is described as being stored in a configuration file, one skilled in the art will appreciate that this information may be retrieved from other sources, such as databases or interactive configurations.

After the configuration file is created, it is used to start a Supernet. For example, when starting a Supernet, the system administrator first starts SASD, which reads the configuration information stored in the configuration file. Then, the administrator starts the VARPD on the administrator's machine, indicating that it will act as the server for the Supernet and also starts the KMS process. After this processing has completed, the Supernet is ready for nodes to join it.

Memory 502 of device 302 contains SNlogin script 522, SNlogout script 524, VARPD 526, KMC 528, KMD 530, and node A 532, all running in user mode. Memory 502 also includes TCP/IP protocol stack 534 and VARPDB 536 running in kernel mode.

SNlogin 522 is a script used for logging into a Supernet. Successfully executing this script results in a Unix shell from which programs (e.g., node A 522) can be started to run within the Supernet context, such that address translation and security encapsulation is performed transparently for them and all they can typically access is other nodes on the Supernet. Alternatively, a parameter may be passed into SNlogin 522 that indicates a particular process to be automatically run in a Supernet context. Once a program is running in a Supernet context, all programs spawned by that program also run in the Supernet context, unless explicitly stated otherwise. SNlogout 524 is a script used for logging out of a Supernet. Although both SNlogin 522 and SNlogout 524 are described as being scripts, one skilled in the art will appreciate that their processing may be performed by another form of software. VARPD 526 performs address translation between node IDs and real addresses. KMC 528 is the key management component for each node that receives updates whenever the key for a channel ("the channel key") changes. There is one KMC per node per channel. KMD 530 receives requests from SNSL 542 of the TCP/IP protocol stack 534 when a packet is received and accesses the appropriate KMC for the destination node to retrieve the appropriate key to decrypt the packet. Node A 532 is a Supernet node running in a Supernet context.

TCP/IP protocol stack 534 contains a standard TCP/UDP layer 538, two standard IP layers (an inner IP layer 540 and an outer IP layer 544), and a Supernet security layer (SNSL) 542, acting as the conduit for all Supernet communications. To conserve memory, both inner IP layer 540 and outer IP layer 544 may share the same instance of the code of an IP layer. SNSL 542 performs security functionality as well as address translation. It also caches the most recently used channel keys for ten seconds. Thus, when a channel key is needed, SNSL 542 checks its cache first, and if it is not found, it requests KMD 530 to contact the appropriate KMC to retrieve the appropriate channel key.

Figure 6:
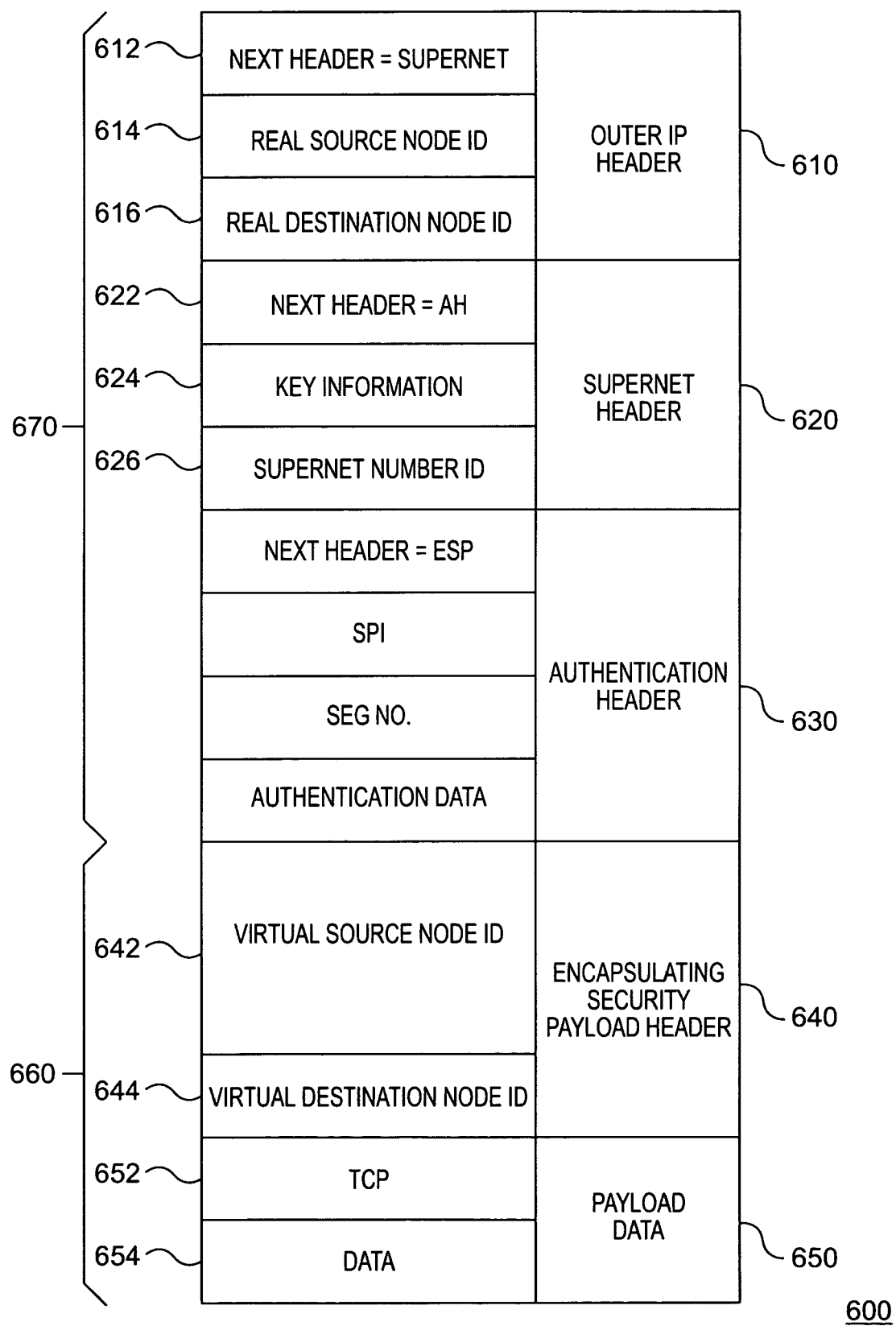
FIG. 6 depicts a datagram packet used by the present invention.

FIG. 6 depicts an exemplary Supernet IP packet 600. Although FIG. 6 depicts an IP packet, one skilled in the art will appreciate that many different packets may be used, such as Appletalk, X.25, or IPX. Supernet packet 600 contains an outer IP header 610, Supernet header 620, Authentication Header (AH) 630, Encapsulating Security Payload (ESP) header 640 and payload data 650. Addressing section 660 corresponds to inner IP layer 540. Delivery scheme section 670 corresponds to the SNSL layer 542 and is meaningful only to the public-network infrastructure. Delivery scheme section 670 and addressing section 660 are opaque to one another.

Outer IP header 610 contains a next header field 612, IP source node address 614, and IP destination node address 616. Next header field 612 identifies the type of the next payload after outer IP header 610, such as Supernet header 620. Source real address 614 contains the real address of the originating node of Supernet packet 600. Destination real address 616 contains the real address of the destination node of Supernet packet 600. Supernet header 620 contains a next header field 622 to identify AH 630, key information field 624, and Supernet number field 626. Key information field 624 contains a key used to encrypt ESP header 640 and payload data 650. Supernet number field 626 contains a channel that Supernet packet 600 uses for communication. AH 630 is used to provide authentication services for Supernet packet 600. For example, AH 630 may be a well-known IPSec header. ESP 640 contains virtual source node address 642 and virtual destination node address 644. Virtual addresses 642 and 644 contain the addresses known only to the members of the channel. For example, referring to FIG. 4, if packet 600 were sent from Node A 316 to Node C 320, virtual source node address 642 would correspond to Node A 316, and virtual destination node address 644 would correspond to Node C 320. Finally, payload data 650 contains the original IP packet sent from the source to the destination. One skilled in the art will appreciate that outer IP header 610, Supernet header 620, AH 630, ESP header 640 and payload data 650 may contain additional fields.

Referring back to FIGS. 5 and 6, SNSL 542 performs security functionality as well as address translation. It also caches the most recently used channel keys for ten seconds. Thus, when a channel key is needed, SNSL 542 checks its cache first, and if it is not found, it requests KMD 530 to contact the appropriate KMC to retrieve the appropriate channel key.

SNSL 542 utilizes VARPDB 536 to perform address translation. VARPDB stores all of the address mappings encountered thus far by SNSL 542. If SNSL 542 requests a mapping that VARPDB 536 does not have, VARPDB communicates with the VARPD 526 on the local machine to obtain the mapping. VARPD 526 will then contact the VARPD that acts as the server for this particular Supernet to obtain it.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Additionally, although a number of the software components are described as being located on the same machine, one skilled in the art will appreciate that these components may be distributed over a number of machines.

Figure 7A:
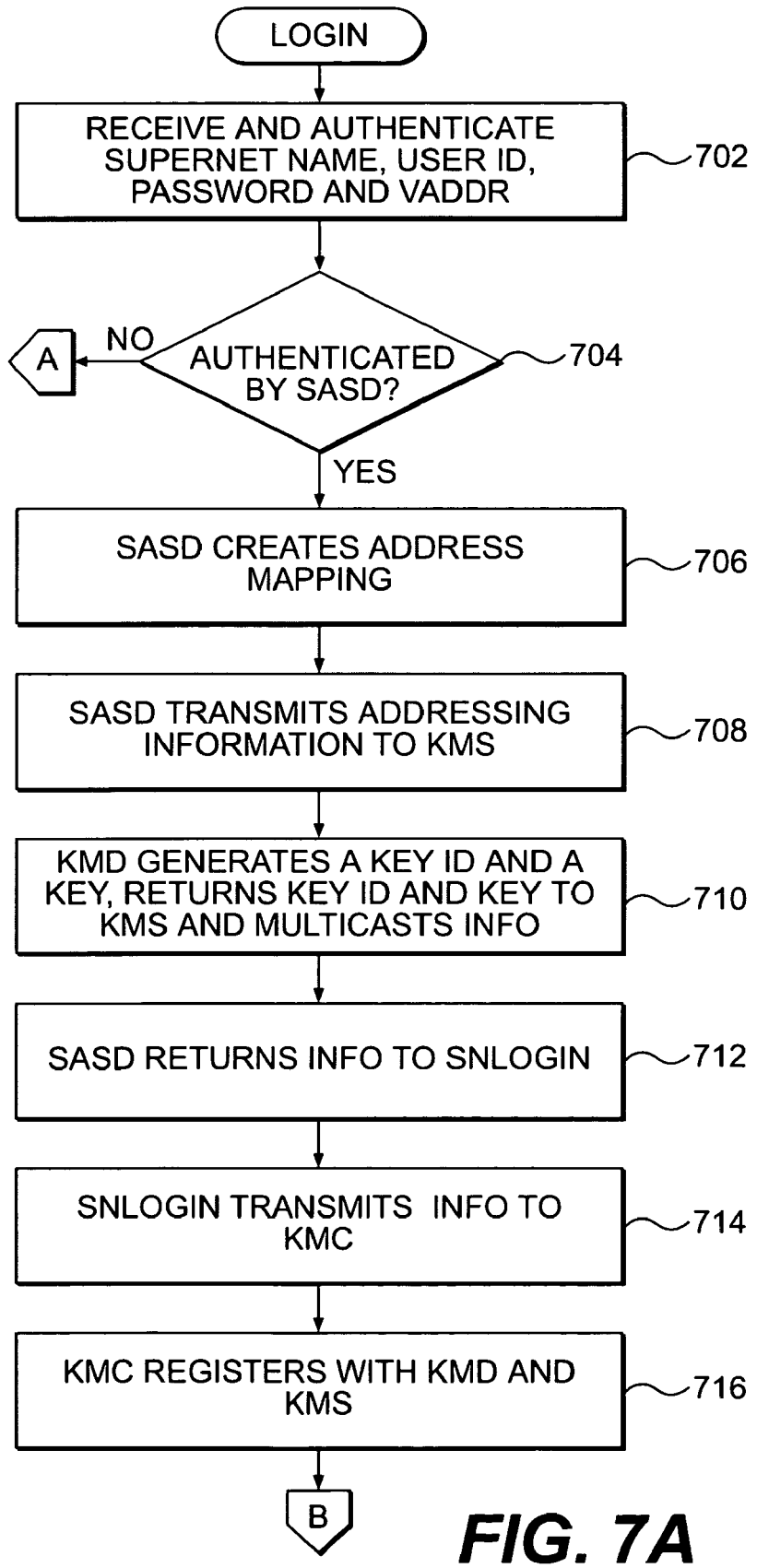
FIGS. 7A and 7B depict a flow chart of the steps performed when a VPN in a manner consistent with the present invention.
Figure 7B:
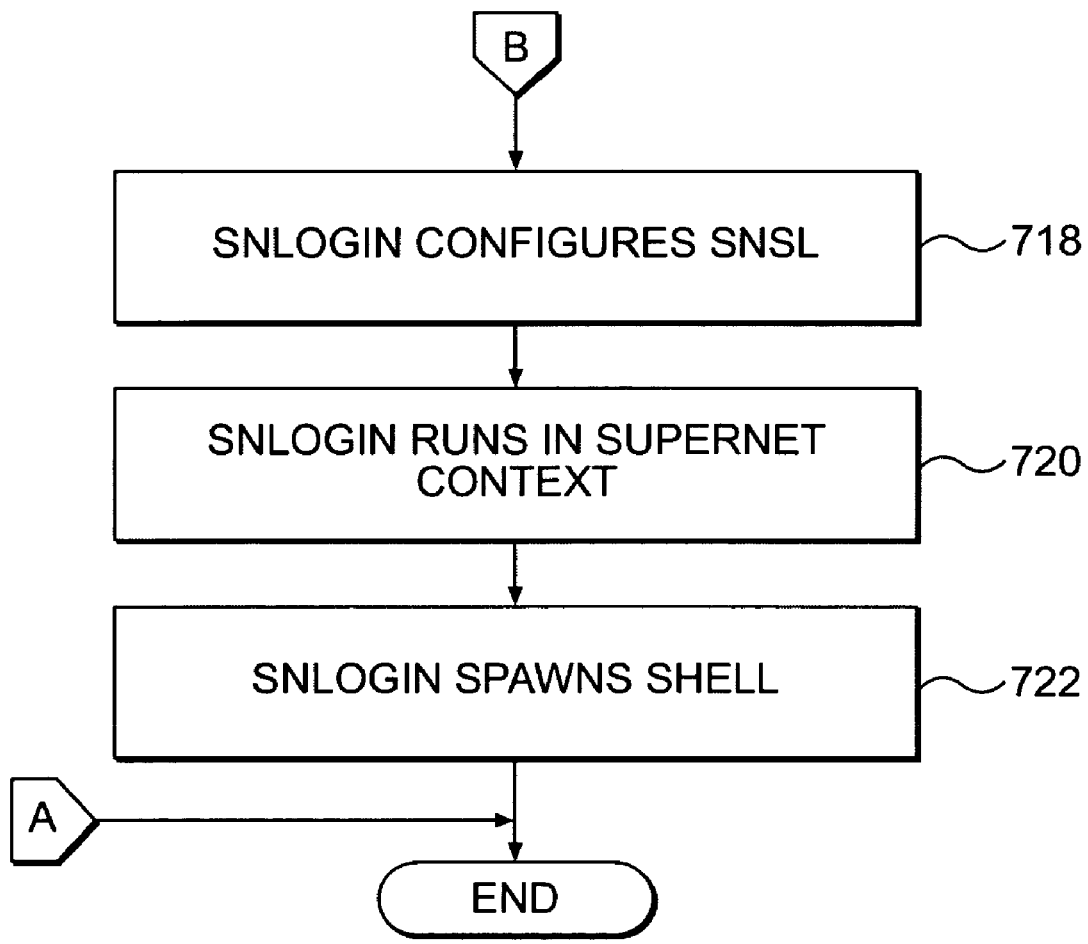

FIGS. 7A and 7B depict a flow chart of the steps performed when a node joins a Supernet. The first step performed is that the user invokes the SNlogin script and enters the Supernet name, their user ID, their password, and a requested virtual address (step 702). Of course, this information depends on the particular authentication mechanism used. Upon receiving this information, the SNlogin script performs a handshaking with SASD to authenticate this information. In this step, the user may request a particular virtual address to be used, or alternatively, the SASD may select one for them. Next, if any of the information in step 702 is not validated by SASD (step 704), processing ends. Otherwise, upon successful authentication, SASD creates an address mapping between a node ID and the real address (step 706). In this step, SASD concatenates the Supernet ID with the virtual address to create the node ID, obtains the real address of the SNlogin script by querying network services in a well-known manner, and then registers this information with the VARPD that acts as the server for this Supernet. This VARPD is identified in the configuration file.

After creating the address mapping, SASD informs the KMS that there is a new Supernet member that has been authenticated and admitted (step 708). In this step, SASD sends the node ID and the real address to KMS who then generates a key ID, a key for use in communicating between the node's KMC and the KMS ("a node key"), and updates the channel key for use in encrypting traffic on this particular channel (step 710). Additionally, KMS sends the key ID and node key to SASD and distributes the channel key to all KMCs on the channel as a new key because a node has just been added to the channel. SASD receives the key ID and the node key from KMS and returns it to SNlogin (step 712). After receiving the key ID and the node key from SASD, SNlogin starts a KMC for this node and transmits to the KMC the node ID, the key ID, the node key, the address of the VARPD that acts as the server for this Supernet, and the address of KMS (step 714). The KMC then registers with the KMD indicating the node it is associated with, and KMC registers with KMS for key updates (step 716). When registering with KMS, KMC provides its address so that it can receive updates to the channel key via the Versakey protocol. The Versakey protocol is described in greater detail in *IEEE Journal on Selected Areas in Communication*, Vol. 17, No. 9, 1999, pp. 1614–1631. After registration, the KMC will receive key updates whenever a channel key changes on one of the channels that the node communicates over.

Next, SNlogin configures SNSL (step 718 in FIG. 7B). In this step, SNlogin indicates which encryption algorithm to use for this channel and which authentication algorithm to use, both of which are received from the configuration file via SASD. SNSL stores this information in an access control list. In accordance with methods and systems consistent with present invention, any of a number of well-known encryption algorithms may be used, including the Data Encryption Standard (DES), Triple-DES, the International Data Encryption Algorithm (IDEA), and the Advanced Encryption Standard (AES). Also, RC2, RC4, and RC5 from RSA Incorporated may be used as well as Blowfish from Counterpane.com. Additionally, in accordance with methods and systems consistent with the present invention, any of a number of well-known authentication algorithms may be used, including Digital Signatures, Kerberos, Secure Socket Layer (SSL), and MD5, which is described in RFC1321 of the Internet Engineering Task Force, April, 1992.

After configuring SNSL, SNlogin invokes an operating system call, SETVIN, to cause the SNlogin script to run in a Supernet context (step 720). In Unix, each process has a data structure known as the "proc structure" that contains the process ID as well as a pointer to a virtual memory description of this process. In accordance with methods and systems consistent with the present invention, the Supernet IDs indicating the channels over which the process communicates as well as its virtual address for this process are added to this structure. By associating this information with the process, the SNSL layer can enforce that this process runs in a Supernet context. Although methods and systems consistent with the present invention are described as operating in a Unix environment, one skilled in the art will appreciate that such methods and systems can operate in other environments. After the SNlogin script runs in the Supernet context, the SNlogin script spawns a Unix program, such as a Unix shell or a service daemon (step 722). In this step, the SNlogin script spawns a Unix shell from which programs can be run by the user. All of these programs will thus run in the Supernet context until the user runs the SNlogout script.

Figure 8:
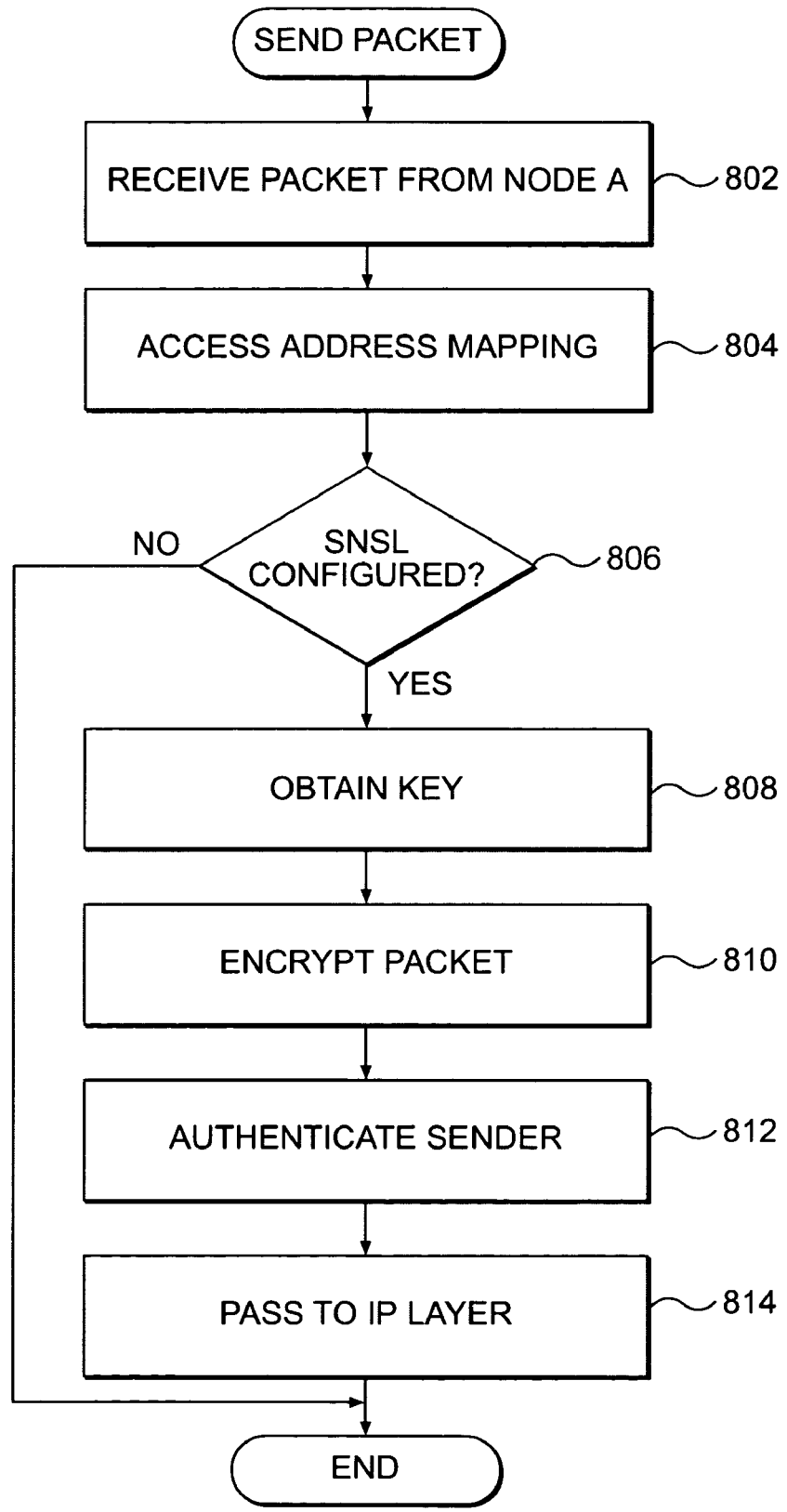
FIG. 8 depicts a flow chart of the steps performed when sending a packet from a node of the VPN in a manner consistent with the present invention.

FIG. 8 depicts a flow chart of the steps performed when sending a packet, such as packet 600 depicted in FIG. 6, from node A. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. The first step performed is for inner IP layer 540 to receive a packet originating from node A via the TCP/UDP layer 538 (step 802). The packet contains virtual source node address 642, virtual destination node address 644, and data 654. The packet may be received from a process executing in node A connected to a socket. A socket is a well-known software object that connects an application to a network protocol. In UNIX, for example, an application can send and receive TCP/IP messages by opening a socket and reading and writing data to and from the socket.

Once inner IP layer 542 receives the packet, a Supernet ID is appended to a socket structure (step 804). The socket structure is modified so as to contain an extra data field for Supernet ID 626 and virtual source address 642. The addition of Supernet ID 626 and virtual address 642 in the socket structure enables the Supernet to communicate with nodes regardless of the delivery scheme used. When the process on node A opens a socket to transmit the packet to inner IP layer 540, the corresponding Supernet ID 626 and virtual source address 642 for that process is included in the socket request.

The packet and Supernet ID are then transmitted to the SNSL layer using the modified socket structure (step 806). The SNSL layer then accesses the VARPDB to obtain the address mapping between virtual source node address 642 and the source real address 614 as well as the virtual destination node address 644 and the destination real address 616 (step 808). If they are not contained in the VARPDB because this is the first time a packet has been sent from this node or sent to this destination, the VARPDB accesses the local VARPD to obtain the mapping. When contacted, the VARPD on the local machine contacts the VARPD that acts as the server for the Supernet to obtain the appropriate address mapping. Since the VARPDB maintains all real IP addresses, a remote node may securely communicate with another remote node without reverfication.

After obtaining the address mapping, the SNSL layer determines whether it has been configured to communicate over the appropriate channel for this packet (step 806). This configuration occurs when SNlogin runs, and if the SNSL has not been so configured, processing ends. Otherwise, SNSL obtains the channel key to be used for this channel (step 808). The SNSL maintains a local cache of keys and an indication of the channel to which each key is associated. Each channel key is time stamped to expire in ten seconds, although this time is configurable by the administrator. If there is a key located in the cache for this channel, SNSL obtains the key. Otherwise, SNSL accesses KMD which then locates the appropriate channel key from the appropriate KMC. After obtaining the key, the SNSL layer encrypts the packet using the appropriate encryption algorithm and the key previously obtained (step 810). When encrypting the packet, the virtual source node address 642, the virtual destination node address 644, and the data may be encrypted (addressing section 660), but the source and destination real addresses 614, 616 (delivery scheme section 670) are not, so that the real addresses can be used by the public network infrastructure to send the packet to its destination. By encrypting addressing scheme 660, the Supernet enables data to be transmitted securely and at the same time transparent from delivery scheme used.

After encrypting the packet, the SNSL layer authenticates the sender to verify that it is the bona fide sender and that the packet was not modified in transit (step 812). In this step, the SNSL layer uses the MD5 authentication protocol, although one skilled in the art will appreciate that other authentication protocols may be used. Next, the SNSL layer passes the packet to outer IP layer 544 where it is then sent to the destination node in accordance with known techniques associated with the IP protocol (step 814). By adding delivery scheme section 670 onto IP packet 600, well-known addresses schemes may behave differently at different times.

Figure 9:
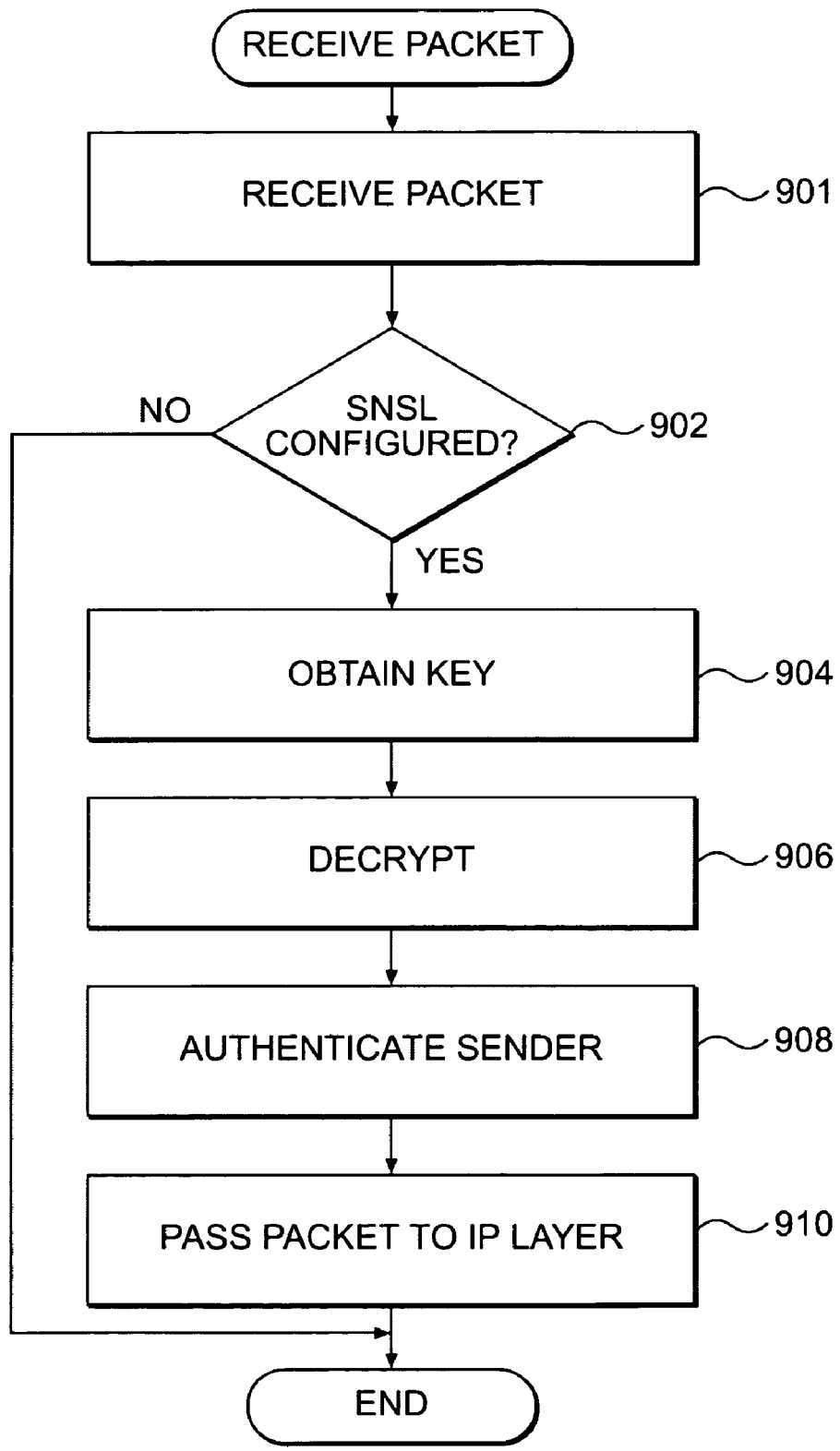
FIG. 9 depicts a flow chart of the steps performed when receiving a packet by a node of the VPN in a manner consistent with the present invention.

FIG. 9 depicts a flow chart of the steps performed by the SNSL layer when it receives a packet. Although the steps of the flow chart are described in a particular order, one skilled in the art will appreciate that these steps may be performed in a different order. Additionally, although the SNSL layer is described as performing both authentication and encryption, this processing is policy driven such that either authentication, encryption, both, or neither may be performed. To receive the packet with the additional information, the receiving node contains a modified socket structure similar to the sending node. The first step performed by the SNSL layer is to receive a packet from the network (step 901). This packet contains a real source address 614 and a real destination address 616 that are not encrypted as well as a virtual source node address 644, a virtual destination node ID 646, and data that are encrypted. Then, it determines whether it has been configured to communicate on this channel to the destination node (step 902). If SNSL has not been so configured, processing ends. Otherwise, the SNSL layer obtains the appropriate key as previously described from key information 624 (step 904). It then decrypts the packet using this key and the appropriate encryption algorithm (step 906). After decrypting the packet, the SNSL layer authenticates the sender and validated the integrity of the packet (step 908) and then it passes the packet to the inner IP layer for delivery to the appropriate node (step 910). To pass the additional information to the inner IP layer, the packet is passed using a modified socket structure. Upon receiving the packet, the inner IP layer uses the destination node ID to deliver the packet.

Figure 10:
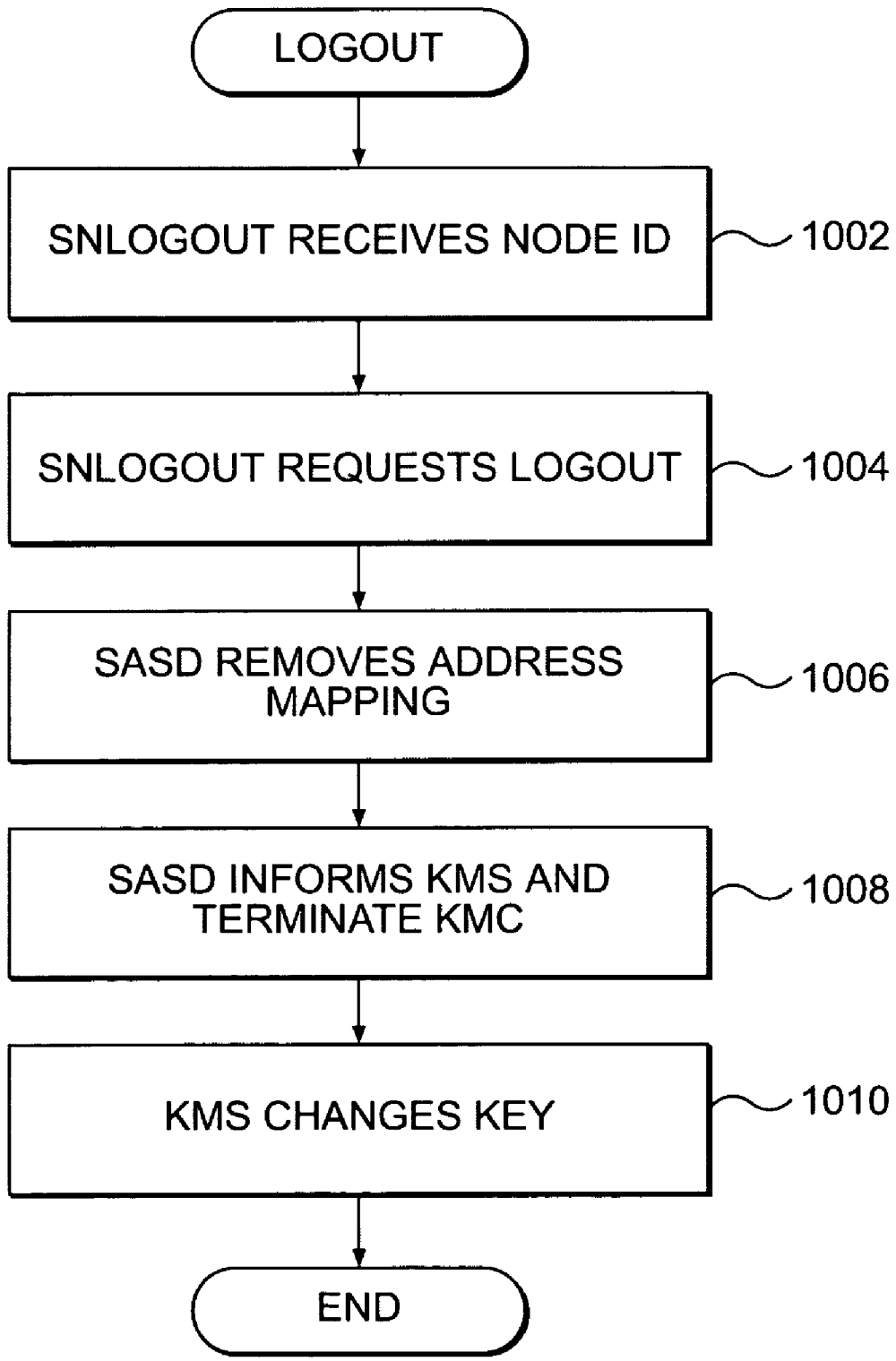
FIG. 10 depicts a flow chart of the steps performed when logging out of a VPN in a manner consistent with the present invention.

FIG. 10 depicts a flow chart of the steps performed when logging a node out of a Supernet. The first step performed is for the user to run the SNlogout script and to enter a node ID (step 1002). Next, the SNlogout script requests a log out from SASD (step 1004). Upon receiving this request, SASD removes the mapping for this node from the VARPD that acts as the server for the Supernet (step 1006). SASD then informs KMS to cancel the registration of the node, and KMS terminates this KMC (step 1008). Lastly, KMS generates a new channel key for the channels on which the node was communicating (step 1010) to reduce the likelihood of an intruder being able to intercept traffic.

Figure 11:
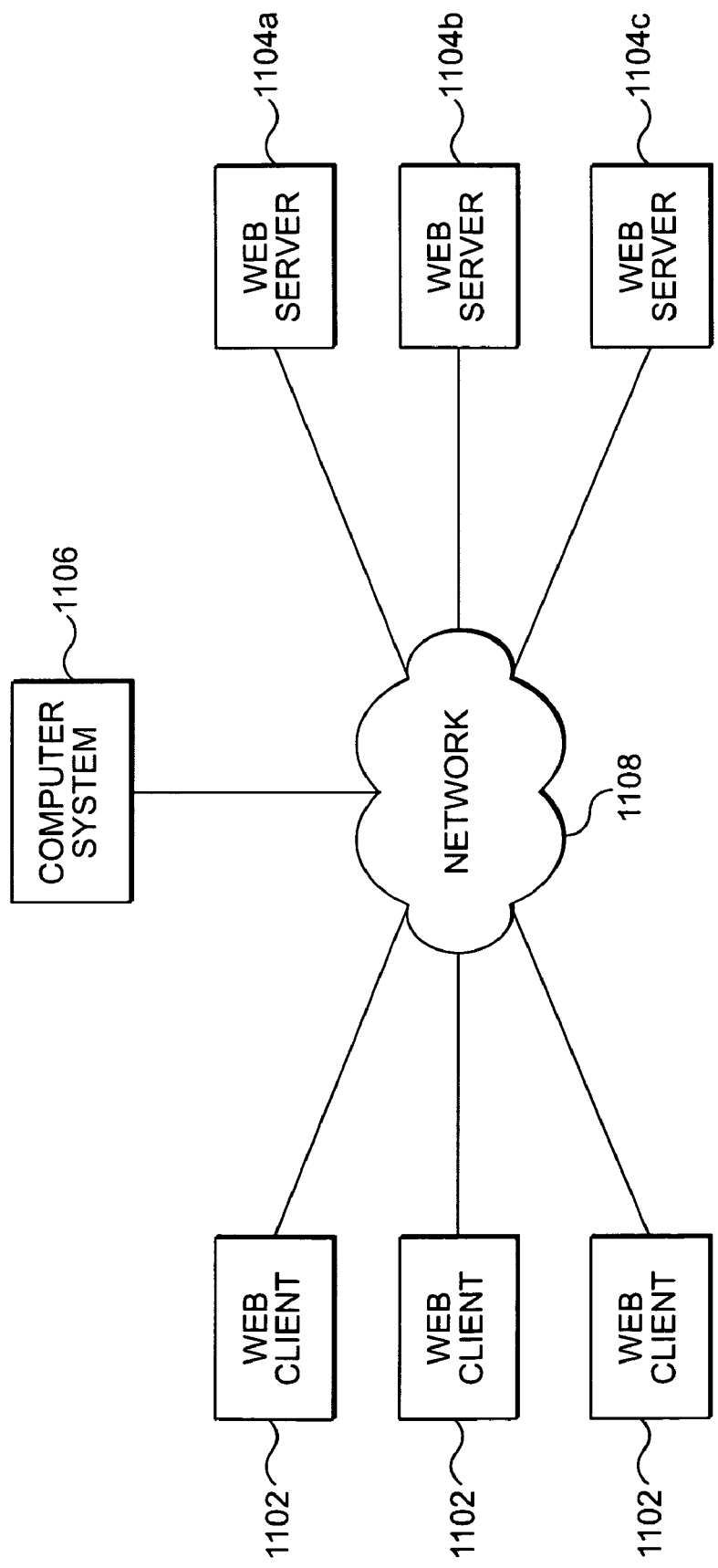
FIG. 11 depicts an embodiment of a web server environment system for use with the invention.

FIG. 11 illustrates a Supernet system 1100 that contains multiple web servers and a web client on the same channel of a Supernet. Various web clients 1102 communicate with web server 1104*a* by sending encrypted packets to the web server as described in FIG. 9. A web client 1102 also connects to a computer system 1106 (containing a VARP server) using a network 1108.

Web client 1102 has a virtual address obtained from computer system 1106, as described in FIGS. 7A and 7B. Each time web client 1102 requests a packet from web server 1104*a*, the client requests the virtual address of the web server 1104*a* from computer system 1106. If web server 1104*a* becomes overloaded (e.g., unable to handle more requests), the overloaded web server spawns new instances of the same web server (web servers 1104*b* and 1104*c*) and at the same time notifies the computer system 1106. The VARP server of computer 1106 then associates the new instances 104*b* and 104*c* of the web server with web server's 1104 virtual address. As a result, web client 1102 is not notified of the change and continues to use the same virtual address as previously.

CONCLUSION

Although the present invention has been described with reference to a preferred embodiment, those skilled in the art will know of various changes in form and detail which may be made without departing from the spirit and scope of the present invention as defined in the appended claims and their full scope of equivalents.

What is claimed is:

1. A method in a public network having a network infrastructure that is used by a private network over which a plurality of nodes communicate, the private network uses a plurality of delivery schemes to communicate between internal addresses that are suitable for use in communicating among the plurality of nodes in the private network, the method comprising:

receiving a request from a user to add a new node to the private network, the request comprising an identifier of the private network and an identifier of the user, the new node for running on a device connected to the network infrastructure, the device having a system-level component used for communicating over the private network;

attempting to authenticate the request including the private network identifier and the user identifier;

when the request has been authenticated successfully, generating an address mapping for the new node, the address mapping used for mapping between the internal address and an external address suitable for communicating over the network infrastructure of the public network, wherein the internal address is not associated with the delivery scheme;

configuring, by the system-level component, the new node in a context such that the new node is capable of communicating with the plurality of nodes on the private network; and sending, by the system-level component, a packet from the new node to a destination one of the plurality of nodes on the private network by accessing the address mapping and adding the external address to the packet and by causing delivery of the packet to the destination node to occur in a secure manner.

2. The method of claim 1, further comprising changing, at runtime, an association between the internal address and the delivery scheme.

3. The method of claim 1, wherein the delivery scheme is anycast, multicast, or unicast.

4. The method of claim 1 wherein configuring comprises:

preventing senders other than the plurality of nodes from communicating with the new node.

5. The method of claim 1 wherein sending the packet comprises:

encrypting the packet.

6. The method of claim 1 wherein sending further comprises:

authenticating the new node.

7. The method of claim 1 wherein the destination node has an associated address mapping between an internal address and an external address, and wherein sending further comprises:

accessing the address mapping of the destination node; and adding the external address of the destination node to the packet.

\* \* \* \* \*

UNITED STATES PATENT AND TRADEMARK OFFICE
CERTIFICATE OF CORRECTION

PATENT NO.    : 6,970,941 B1
DATED         : November 29, 2005
INVENTOR(S)   : Germano Caronni et al.

It is certified that error appears in the above-identified patent and that said Letters Patent is hereby corrected as shown below:

<u>Title page,</u>
Item [75], Inventors, "Kulmar" should read -- Kumar --.

Signed and Sealed this

Seventeenth Day of January, 2006

JON W. DUDAS
*Director of the United States Patent and Trademark Office*